United States Patent
Zhu et al.

(10) Patent No.: US 11,178,676 B2
(45) Date of Patent: Nov. 16, 2021

(54) FIRST COMMUNICATION DEVICE, SECOND COMMUNICATION DEVICE, AND METHODS PERFORMED THEREBY FOR HANDLING UPLINK TRANSMISSIONS BASED ON QUALITY OF SERVICE REQUIREMENTS

(71) Applicant: Telefonaktiebolaget LM Ericsson (publ), Stockholm (SE)

(72) Inventors: Huaisong Zhu, Beijing (CN); Jonas Fröberg Olsson, Ljungsbro (SE); Caner Kilinc, Luleå (SE); Qianxi Lu, Beijing (CN); Jianfeng Wang, Beijing (CN); Zhan Zhang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 71 days.

(21) Appl. No.: 16/474,275

(22) PCT Filed: Jan. 25, 2018

(86) PCT No.: PCT/SE2018/050057
§ 371 (c)(1),
(2) Date: Jun. 27, 2019

(87) PCT Pub. No.: WO2018/143869
PCT Pub. Date: Aug. 9, 2018

(65) Prior Publication Data
US 2020/0128567 A1    Apr. 23, 2020

(30) Foreign Application Priority Data

Feb. 3, 2017  (WO) ................ PCT/CN2017/072811

(51) Int. Cl.
H04W 72/12    (2009.01)
H04W 72/14    (2009.01)

(52) U.S. Cl.
CPC ..... *H04W 72/1236* (2013.01); *H04W 72/1268* (2013.01); *H04W 72/14* (2013.01); *H04W 72/1242* (2013.01)

(58) Field of Classification Search
CPC combination set(s) only.
See application file for complete search history.

(56) References Cited

U.S. PATENT DOCUMENTS 10,631,319 B2 * 4/2020 Li .................... H04W 4/70
2008/0049772 A1  2/2008 Faniuolo et al.
(Continued)

FOREIGN PATENT DOCUMENTS

EP   2744290 A1   6/2014
WO   2016120693 A1  8/2016

OTHER PUBLICATIONS

Unknown, Author, "3rd Generation Partnership Project; Technical Specification Group Services and System Aspects; Feasibility Study on New Services and Markets Technology Enablers for Critical Communications; Stage 1 (Release 14)", 3GPP TR 22.862 V14.1.0 (Sep. 2016), Sep. 2016, pp. 1-31.
(Continued)

*Primary Examiner* — Yee F Lam
(74) *Attorney, Agent, or Firm* — Christopher & Weisberg, P.A.

(57) ABSTRACT

A method performed by a first communication device (101) operating in a wireless communications network (100). The first communication device (101) obtains (301) a grant for an uplink transmission to a second communication device (102) operating in the 5 wireless communications network (100). The grant comprises a first indication of one or more first sets of parameters for transmission. The first communication device (101) selects (302) a second set of parameters for the uplink transmission based on: i) the indicated one or more first sets of parameters, and ii) one or more
(Continued)

quality of service requirements of an information to be transmitted in the uplink transmission. The first 10 communication device (101) then initiates (304) sending the uplink transmission to the second communication device (102), based on the selected second set of parameters.

20 Claims, 6 Drawing Sheets

(56) References Cited

U.S. PATENT DOCUMENTS

| | | | |
|---|---|---|---|
| 2017/0238305 A1* | 8/2017 | Chen | H04W 52/06 370/311 |
| 2018/0035459 A1* | 2/2018 | Islam | H04W 74/04 |
| 2018/0092125 A1* | 3/2018 | Sun | H04W 74/02 |
| 2018/0139774 A1* | 5/2018 | Ma | H04L 1/189 |
| 2018/0176945 A1* | 6/2018 | Cao | H04L 5/0055 |
| 2018/0279339 A1* | 9/2018 | Lohr | H04W 52/365 |
| 2019/0116582 A1* | 4/2019 | Pelletier | H04W 72/10 |
| 2019/0320467 A1* | 10/2019 | Freda | H04L 5/0055 |
| 2020/0037345 A1* | 1/2020 | Ryoo | H04W 72/1284 |
| 2020/0296749 A1* | 9/2020 | Freda | H04W 28/0268 |
| 2020/0396698 A1* | 12/2020 | Bala | H04L 5/0005 |

OTHER PUBLICATIONS

Unknown, Author, "3rd Generation Partnership Project; Technical Specification Group Services and System Aspects; Study on Architecture for Next Generation System (Release 14)", 3GPP TR 23.799 V1.1.0, Oct. 2016, 501 pages.

Unknown, Author, "Discussion on multiplexing of eMBB and URLLC", 3GPP TSG RAN1 WG Meeting #86, R1-167708, Gothenburg, Sweden, Aug. 22-26, 2016, pp. 1-5.

Unknown, Author, "Final Report of 3GPP TSG RAN WG1 #86bis v1.0.0", 3GPP TSG RAN WG1 Meeting #87, R1-1611081, MCC Support, Lisbon, Portugal, Oct. 10-14, 2016, 160 pages.

Unknown, Author, "UL URLLC Multiplexing Considerations", 3GPP TSG RAN WG1 Meeting #87, R1-1611657, Reno, USA, Nov. 14-18, 2016, pp. 1-6.

* cited by examiner

FIRST COMMUNICATION DEVICE, SECOND COMMUNICATION DEVICE, AND METHODS PERFORMED THEREBY FOR HANDLING UPLINK TRANSMISSIONS BASED ON QUALITY OF SERVICE REQUIREMENTS

TECHNICAL FIELD

The present disclosure relates generally to a first communication device and methods performed thereby for handling uplink transmissions based on quality of service requirements in a wireless communications network. The present disclosure also relates generally to a second communication device and methods performed thereby for handling uplink transmissions based on quality of service requirements in a wireless communications network. The present disclosure further relates to computer program products, comprising instructions to carry out the actions described herein, as performed by the first communication device, and the second communication device. The computer program products may be stored on computer-readable storage mediums.

BACKGROUND

Communication devices within a wireless communications network may be e.g., stations (STAs), User Equipments (UEs), mobile terminals, wireless terminals, terminals, and/or Mobile Stations (MS). Wireless devices are enabled to communicate wirelessly in a cellular communications network or wireless communication network, which may be a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

In other examples, communication devices may be network nodes. A network node refers to any type of network node serving a User Equipment (UE) and/or connected to another network node or network element or any radio node from where a UE may receive a signal. Examples of network nodes are Access Point (AP), transmission points, transmission nodes, Node B, Base Station (BS), Multi-Standard Radio (MSR) radio node, such as MSR BS, eNode B, network controller, Radio Network Controller (RNC), base station controller, relay, donor node controlling relay, Base Transceiver Station (BTS), Remote Radio Unit (RRU), Remote Radio Head (RRH), nodes in Distributed Antenna System (DAS) etc. The wireless communications network covers a geographical area which may be divided into cell areas, each cell area being served by network node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g., Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams.

The standardization organization 3rd Generation Partnership Project (3GPP) is currently in the process of specifying a New Radio Interface called NR or 5G-UTRA, as well as a Fifth Generation of radio network (5G) Packet Core Network, which may be referred to as Next Generation Core Network, abbreviated as NG-CN, NGC or 5G CN. The current understanding of various concepts related to this work may be based on input from 3GPP TS 23.799 v1.1.0.

The 5G RAN may comprise base stations supporting evolved Long-Term Evolution (LTE) and/or New Radio (NR) radio access. In 5G RAN, base stations, which may be referred to as gNBs, eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

In a wireless communications network, transmitted traffic may have different requirements for a quality of service. Herein, Ultra-Reliable and Low-Latency Communications (URLLC) and Enhanced Mobile Broadband (eMBB) traffic are used as non-limiting examples of traffic having different requirements for a quality of service, to illustrate the issues a wireless communications network, such as a network supporting NR may encounter to meet such requirements.
Ultra-Reliable and Low-Latency Communications (URLLC) Service URLLC was one of the cases defined in TR 22.862 V14.1.0. In this category, both reliability of communication and low latency were highly demanded. It may be noted that these requirements are mutually conflicting. Usually, the two aspects may be traded for each other, that is, it may be relatively easy to achieve one aspect by trading-off the other, while for URLLC both should be met simultaneously, which poses a remarkable challenge to User-Plane (UP) design.

According to 3GPP TR 22.862 V14.1.0, the latency requirements for URLLC range from 1 millisecond (ms) to 10 ms for different concrete applications, ranging from automation applications, smart grid to intelligent transportation, and reliability from a residual error rate of $10^{-4}$, $10^{-6}$, to $10^{-9}$. It may be noted that such residual error rate calculation should regard packets sent later than the demanded latency bound such as 1 ms or 10 ms as errors or invalid in the context of URLLC. That is, the latency may need to be below the latency restriction, otherwise the packets may be regarded as an error.

Simultaneously achieving such high demands on both reliability and latency may impact many layers and components of both RAN and core network. URLLC may be regarded as an extremely high Quality of Service (QoS) use case both in RAN and core network.
Enhanced Mobile Broadband (eMBB)

eMBB may be understood as an evolution of the mobile broadband provided by the 4G LTE and LTE-A networks. It mainly targets higher area traffic capacity, higher peak data rate and better user experience data rate. eMBB may also be understood as providing better support for network energy efficiency, user mobility and spectrum efficiency.

URLLC and Enhanced Mobile Broadband (eMBB) Multiplexing in NR

In the communication network, URLLC traffic may be transmitted with traffic having a different requirement for a quality of service such as that of eMBB. In 3GPP RAN1#86b, the following agreements were reached regarding the multiplexing of URLLC and eMBB services in the DL:

From network perspective, multiplexing of transmissions with different latency and/or reliability requirements for eMBB/URLLC in DL is supported by
  Using the same sub-carrier spacing with the same Control Plane (CP) overhead
    For Further Study (FFS): different CP overhead
  Using different sub-carrier spacing
    FFS: CP overhead
  NR supports both approaches by specification
NR should support dynamic resource sharing between different latency and/or reliability requirements for eMBB/URLLC in DL For uplink transmission, existing methods may result in transmissions not meeting a certain required quality of service, such as that required by traffic having a very high quality of service which may need to take precedence over other traffic. That is, preemptive traffic, such as URLLC traffic. Hence, the provision of the URLLC service in the uplink is not guaranteed in the UL.

SUMMARY

It is an object of embodiments herein to improve the handling of uplink transmissions based on quality of service requirements in a wireless communications network.

According to a first aspect of embodiments herein, the object is achieved by a method performed by a first communication device operating in a wireless communications network. The first communication device obtains a grant for an uplink transmission to a second communication device operating in the wireless communications network. The grant comprises a first indication of one or more first sets of parameters for transmission. The first communication device selects a second set of parameters for the uplink transmission based on: i) the indicated one or more first sets of parameters, and ii) one or more quality of service requirements of an information to be transmitted in the uplink transmission. The first communication device also initiates sending the uplink transmission to the second communication device, based on the selected second set of parameters.

According to a second aspect of embodiments herein, the object is achieved by a method performed by the second communication device operating in the wireless communications network. The second communication device receives the second indication of the selected second set of parameters from the first communication device operating in the wireless communications network. The second set of parameters is for the uplink transmission to the second communication device. The second set of parameters has been selected by the first communication device from the one or more first sets of parameters for transmission indicated by the first indication comprised in the grant for the uplink transmission. The selected second set of parameters has been selected based on: i) the indicated one or more first sets of parameters, and ii) the one or more quality of service requirements of the information transmitted in the uplink transmission. The second communication device also initi-
ates reception of the uplink transmission from the first communication device, based on the indicated second set of parameters.

According to a third aspect of embodiments herein, the object is achieved by the first communication device. The first communication device is configured to operate in the wireless communications network. The first communication device is further configured to obtain the grant for the uplink transmission to the second communication device configured to operate in the wireless communications network. The grant comprises the first indication of the one or more first sets of parameters for transmission. The first communication device selects the second set of parameters for the uplink transmission based on: i) the one or more first sets of parameters configured to be indicated, and ii) the one or more quality of service requirements of the information configured to be transmitted in the uplink transmission. The first communication device also sends the uplink transmission to the second communication device, based on the second set of parameters configured to be selected.

According to a fourth aspect of embodiments herein, the object is achieved by the second communication device configured to operate in a wireless communications network. The second communication device is further configured to receive the second indication of the selected second set of parameters from the first communication device configured to operate in the wireless communications network. The second set of parameters is for the uplink transmission to the second communication device. The second set of parameters is configured to have been selected by the first communication device from the one or more first sets of parameters for transmission configured to be indicated by the first indication comprised in the grant for the uplink transmission. The selected second set of parameters is configured to have been selected based on: i) the one or more first sets of parameters configured to be indicated, and ii) the one or more quality of service requirements of the information configured to be transmitted in the uplink transmission. The second communication device also initiates reception of the uplink transmission from the first communication device, based on the second set of parameters configured to be indicated.

According to a fifth aspect of embodiments herein, the object is achieved by a computer program, comprising instructions which, when executed on at least one processor, cause the at least one processor to carry out the method performed by the first communication device.

According to a sixth aspect of embodiments herein, the object is achieved by a computer-readable storage medium, having stored thereon the computer program, comprising instructions which, when executed on at least one processor, cause the at least one processor to carry out the method performed by the first communication device.

According to a seventh aspect of embodiments herein, the object is achieved by a computer program, comprising instructions which, when executed on at least one processor, cause the at least one processor to carry out the method performed by the second communication device.

According to an eighth aspect of embodiments herein, the object is achieved by a computer-readable storage medium, having stored thereon the computer program, comprising instructions which, when executed on at least one processor, cause the at least one processor to carry out the method performed by the second communication device.

By selecting the second set of parameters for the uplink transmission based on the indicated one or more first sets of parameters, and the one or more quality of service requirements of the information to be transmitted in the uplink transmission, the first communication device may ensure that no matter when, that is, how late, in the preparation of the uplink transmission, information of a certain quality of service requirement, such as that of URLLC traffic, may arrive, that information is transmitted in the uplink with the required certain quality of service.

BRIEF DESCRIPTION OF THE DRAWINGS

Examples of embodiments herein are described in more detail with reference to the accompanying drawings, and according to the following description.

DETAILED DESCRIPTION

As part of the development of embodiments herein, a problem of the existing methods will first be identified and discussed.

During the course of preparation of UL transmissions, arriving traffic may have different requirements for quality of service, e.g., QoS. An illustrative example of this is the URLLC preemption in UL, such as that applying to multiplexing of URLLC and eMBB transmissions. Preemption may be understood as a right to acquire UL resources for transmission, even if already granted for other transmissions. However, one of skill in the art will understand that this problem, that is QoS traffic preemption when a UE only receives on scheduling command, may apply to other types of traffic with differences in QoS requirements. For UL transmission, considering different QoS requirements between eMBB and URLLC in terms of latency and reliability, a provided UL grant may need to be different in terms of detailed Layer 1 (L1) parameters, such as Modulation and Coding Scheme (MCS), Transmission (TX) power and etc. . . . . Therefore the parameters detailed in relation to an UL grant provided for eMBB transmission may not be appropriate to fulfil the requirements for the UL transmission.

Figure 1:
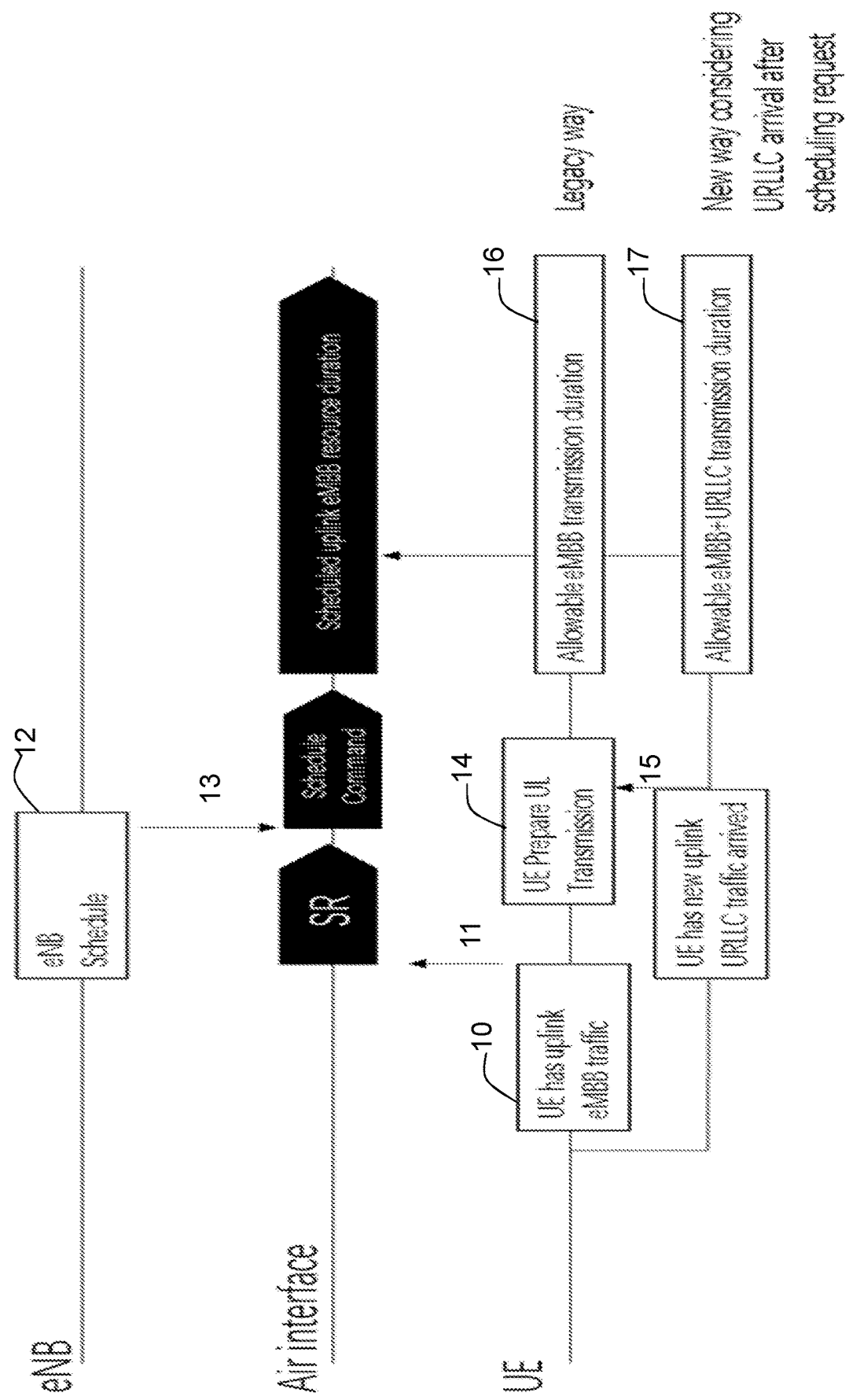
FIG. 1 is a schematic diagram illustrating preemptive transmission of URLLC.

FIG. 1 is a schematic diagram illustrating an example of the problem just presented. At 10, a UE has UL eMBB traffic to transmit, so it sends at 11 a scheduling request (SR) to an eNB serving it, through the air interface. At 12, the eNB schedules the UL transmission for the UE, and sends a schedule command to the UE at 13. After the UE receives from an eNB an uplink assignment for eMBB, where the L1 parameters may be specified for eMBB traffic, and starts preparing the UL transmission of the eMBB traffic at 14, URLLC traffic arrives at the UE buffer at 15. At this time point, due to the limited latency budget of URLLC traffic, the UE should prioritize the packet of URLLC over eMBB. However, if the UE follows the L1 parameters given in the UL grant at 16, which is provided for eMBB traffic, the reliability may not be guaranteed, e.g., due to a high level MCS scheme. It may be understood that according to legacy methods, only one set of parameters are provided, and UE must obey this parameters. Therefore, either URLLC may not guarantee latency, considering eMBB, or eMBB will waste too many unnecessary resources. Although grant-based transmission is shown in FIG. 1, it may be understood that a similar problem is applicable for transmission that may arise from a configuration in the UE allowing a grant to be obtained. This second type of transmission, which does not involve a dynamic signalling by the eNB, may be referred to elsewhere as "grant-free transmission". In grant-free transmission, transmission parameters may be assigned by Radio Resource Control (RRC) signalling. The UE may keep these parameters unless a re-configuration is performed for all uplink transmission. Herein, both of these types of transmission are understood as resulting in a grant for transmission, whether it may be provided by the eNB or by a configuration in the UE. "Grant-free transmission" may be understood as being within the framework of semi-persistent scheduling, such as a periodic uplink grant, wherein e.g., the UE may obtain a grant according to the semi-persistent scheduling if it has data to transmit.

In order to address this problem, several embodiments are comprised herein. Embodiments herein may be understood to relate to adapting or selecting transmission parameters for guaranteeing a required QoS in an UL transmission. Regarding the example problem presented in FIG. 1, embodiments herein may be understood to relate to how the UE may adapt the, e.g., L1 parameters, and how the UE may make the eNB, or NR gNB, be aware of the adaptation in order for correct reception. Particular embodiments herein may be understood to relate to a method to support URLLC transmission multiplexed with traffic with different requirements, such as eMBB traffic. This is schematically indicated in FIG. 1, as the "New way considering URLLC arrival after scheduling request", wherein the multiplexing is indicated by the plus sign at 17. Particular embodiments herein may also be understood, given their characteristics, to relate to an enhanced Preemptive UL Transmission in NR for URLLC, the features of which will be described in the methods disclosed below.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from 3GPP LTE and 5G NR has been used in this disclosure to exemplify the embodiments herein, this should not be seen as limiting the scope of the embodiments herein to only the aforementioned system. Other wireless systems, including WCDMA, WiMax, UMB and GSM, may also benefit from exploiting the ideas covered within this disclosure.

Figure 2:
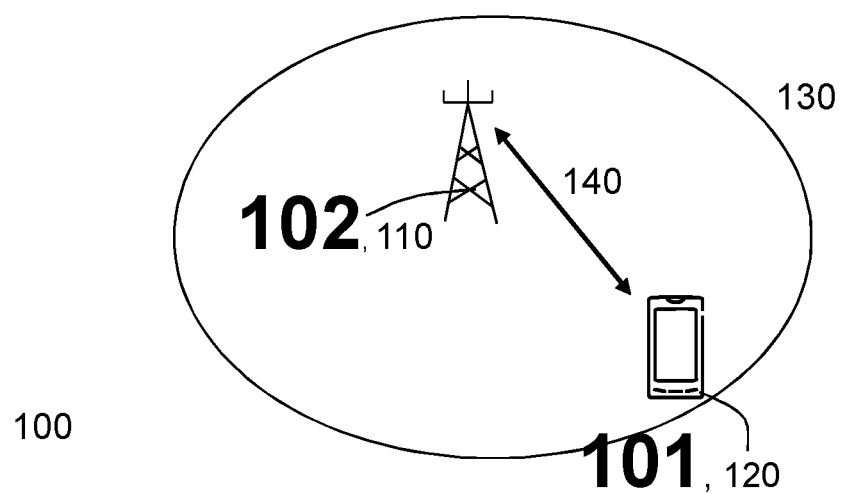
FIG. 2 is a schematic diagram illustrating embodiments of a wireless communications network, according to embodiments herein.

FIG. 2 depicts an example of a wireless communications network 100, sometimes also referred to as a wireless communications system, cellular radio system, or cellular network, in which embodiments herein may be implemented. The wireless communications network 100 may typically be a 5G system, 5G network, or Next Gen System or network. The wireless communications network 100 may support other technologies such as, for example, LTE, e.g. LTE Frequency Division Duplex (FDD), LTE Time Division Duplex (TDD), LTE Half-Duplex Frequency Division Duplex (HD-FDD), LTE operating in an unlicensed band, WCDMA, Universal Terrestrial Radio Access (UTRA) TDD, GSM network, GERAN network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 3GPP LTE may be used in this disclosure to exemplify embodiments herein, this should not be seen as limiting the scope of the embodiments herein to only the aforementioned system. The wireless communications network may also be a non-cellular system, comprising network nodes which may serve receiving nodes, such as wireless devices, with serving beams. This may be a typical case, e.g., a in a 5G network.

The wireless communications network 100 comprises a plurality of communication devices, such as the first communication device 101, and the second communication device 102. The second communication device 102 may be a network node such as network node 110 described below, or a wireless device such as wireless device 120 described below. The first communication device 101 may be a wireless device such as wireless device 120 described below. The first communication device 101 is different than the second communication device 102. Typically, the first communication device 101 will be the wireless device 120 and the second communication device 102 will be the network node 110. This corresponds to the non-limiting particular example illustrated in FIG. 2. In Device to Device (D2D) communications, both of the first communication device 101 and the second communication device 102 may be different wireless devices, both in the UL and in the DL.

The wireless communications network 100 comprises a plurality of network nodes, whereof a network node 110 is depicted in FIG. 2. The network node 110 may be a transmission point such as a radio base station, for example an eNB, an eNodeB, or a Home Node B, a Home eNode B, or any other network node capable of serving a wireless device, such as a user equipment or a machine type communication device, in the wireless communications network 100.

The wireless communications network 100 covers a geographical area which may be divided into cell areas, wherein each cell area may be served by a network node, although, one network node may serve one or several cells. In the non-limiting example depicted in FIG. 2, the network node 110 serves a cell 130. In examples wherein the wireless communications network 100 may be a non-cellular system, the network node 110 may serve receiving nodes, such as wireless devices, with serving beams. The network node 110 may be of different classes, such as, e.g., macro eNodeB, home eNodeB or pico base station, based on transmission power and thereby also cell size. Typically, the wireless communications network 100 may comprise more cells similar to the cell 130, served by their respective network node. This is not depicted in FIG. 2 for the sake of simplicity. The network node 110 may support one or several communication technologies, and its name may depend on the technology and terminology used. In LTE or in a 5G Network, the network node 110, which may be referred to as eNodeBs or even eNBs, may be directly connected to one or more core networks.

A plurality of wireless devices may be located in the wireless communication network 100, whereof a wireless device 120, is depicted in the non-limiting example of FIG. 2. The wireless device 120 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the wireless devices comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, Machine-to-Machine (M2M) device, device equipped with a wireless interface, such as a printer or a file storage device, modem, or any other radio network unit capable of communicating over a wired or radio link in a communications system. The wireless device 120 comprised in the wireless communications network 100 is enabled to communicate wirelessly in the wireless communications network 100. The communication may be performed e.g., via a RAN and possibly the one or more core networks, which may comprised within the wireless communications network 100.

The network node 110 is a serving network node of the wireless device 120. The wireless device 120 is configured to communicate within the wireless communications network 100 with the network node 110 over a link 140, e.g., a radio link.

In general, the usage of "first" and/or "second" herein may be understood to be an arbitrary way to denote different entities, and may be understood to not confer a cumulative or chronological character to the nouns they modify.

Embodiments herein may be based on the description provided below, which uses non-limiting illustrative examples. In the following description, for the sake of illustration, LTE concepts and terminology may be used.

Also, in the following description, any reference to URLLC may be understood to equally refer to a first type of traffic. The first type of traffic may have a first requirement for a quality of service, e.g., QoS. Likewise, any reference to non-URLLC or eMBB may be understood to equally refer to a second type of traffic, or another type of traffic. The second type of traffic may have a second requirement for a quality of service, e.g., QoS. The first requirement for quality of service may be different than the second requirement for the quality of service.

Figure 3:
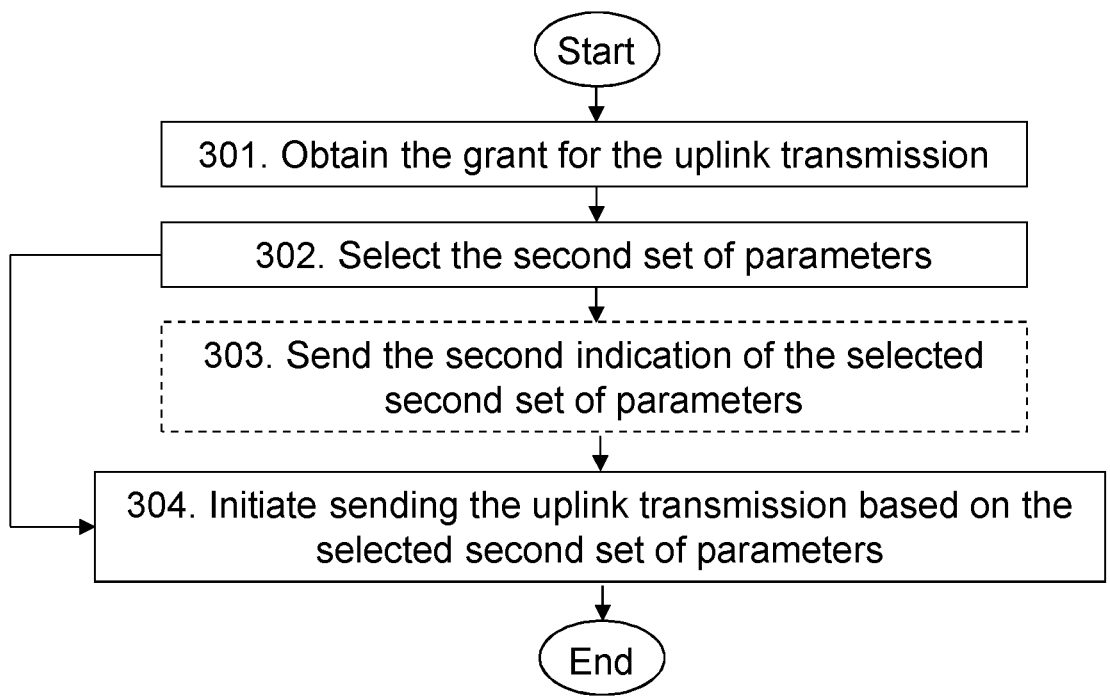
FIG. 3 is a flowchart depicting embodiments of a method performed by a first communication device, according to embodiments herein.

Embodiments of method performed by a first communication device 101, will now be described with reference to the flowchart depicted in FIG. 3. The method may be understood to be for handling uplink transmissions based on quality of service requirements. The first communication device 101 operates in the wireless communications network 100.

The method may comprise the actions described below. Several embodiments are comprised herein. In some embodiments some of the actions may be performed. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 3, optional actions are indicated with dashed boxes. Some of the actions may be performed in a different order than that indicated, or they may be performed at the same time, e.g., Action 303 and Action 304.

Action 301

During the course of operation in the wireless communications network 100, the first communication device 101 may have data to send in the UL. The data may be a certain type of traffic, e.g., non-URLLC traffic such as eMBB traffic, which may have a particular, e.g., a first, quality of service requirement. Following the example described earlier in relation to FIG. 1, the first communication device 101 may have sent a scheduling request to the second communication device 102 to be able to transmit the data in the UL with the particular quality of service requirement for the type of traffic of the data.

In order to be able to send the data, in this Action 301, the first communication device 101 obtains 301 a grant for an uplink transmission to the second communication device 102 operating in the wireless communications network 100. The grant comprises a first indication of one or more first sets of parameters for transmission.

The one or more first sets of parameters for transmission indicated by the first indication comprised in the obtained grant may be based on the quality of service requirement of the data to send in the UL, and may be understood to serve the purpose of enabling to fulfil the particular quality of the service requirement of the type of traffic of the data. The one or more first sets of parameters for transmission may belong to sets of parameters configured to provide for different QoS requirements, as described in further detail later with specific examples.

The parameters for transmission may be e.g., Modulation and Coding Scheme (MCS), a Transmission Time Interval (TTI) bundling indicator, a Transmitter Power Control (TPC) command, etc. . . . as the parameters described later. For example, these parameters, especially MCS and Transmitter Power Control (TPC) command, possibly some others, may vary between URLLC and non-URLLC traffic in order for provide for different trade-off between resource efficiency and reliability. Therefore, two sets of L1 parameters may be needed for different QoS requirements, respectively.

The first indication may be e.g., an MCS value.

The grant for the uplink transmission may be understood as an uplink grant.

The uplink transmission may be a transport block.

In some embodiments, the obtaining, in this Action 301, of the grant for the uplink transmission may comprise at least one of: a) receiving the grant from the second communication device 102 in a message, b) receiving the grant from the second communication device 102 on a downlink control channel, c) autonomous determination, and d) the first communication device 101 obtaining the grant based on a configuration of the first communication device 101 allowing the grant to be obtained.

Either of the options a) and b) may be understood to correspond to a case of a "grant-based transmission", as described earlier. The receiving from the second communication device 102 may be performed via the link 140. Either of the options c) and d) may be understood to correspond to a case of "grant-free transmission", as described above.

In some embodiments, the message may be one of: a downlink control information message, e.g., a DCI message, and a message received during radio resource control signalling, e.g., RRC signalling.

Action 302

After the first communication device 101 may have obtained the grant, other data, e.g., URLLC traffic, may arrive at the first communication device 101 for transmission in the UL. Since the other data may have a different quality of service requirement than the data for which the grant was obtained in Action 301, and since the one or more first sets of parameters for transmission indicated in the obtained grant may not be adequate to fulfil the different quality of service requirement of the other data, in this Action 302, the first communication device 101 selects a second set of parameters for the uplink transmission based on: i) the indicated one or more first sets of parameters, and ii) one or more quality of service requirements of an information to be transmitted in the uplink transmission, such as the one or more quality of service requirements of the URLLC traffic. The information to be transmitted may be for example, URLLC traffic only, or URLLC and non-URLLC traffic.

The selected second set of parameters may be understood to guarantee a certain quality of service. In some embodiments, the selected second set of parameters may guarantee the certain quality of service when the uplink transmission is to URLLC traffic.

Selecting may be understood as choosing. In some examples, selecting may be understood as obtaining or creating, whereas in others it may be adjusting at least one parameter in at least one set of the one or more first sets of parameters. The selected second set of parameters may be one of: a) selected from a first set of parameters and a second first set of parameters of the indicated one or more first sets of parameters, b) a combination of parameters selected from the indicated one or more first sets of parameters, c) different from any of the one or more first sets of parameters indicated in the grant, the grant being obtained from the second communication device 102; and d) different from any of the one or more first sets of parameters indicated in the grant, the grant being obtained from a configuration of the first communication device 101 for uplink transmission.

Any of the parameters comprised in the one or more first sets of parameters and/or the second set of parameters may be L1 parameters.

Action 303

In order to enable the second communication device 102 to properly process the UL transmission it may receive from the first communication device 101, the first communication device 101 may, in this Action 303, send a second indication of the selected second set of parameters to the second communication device 102.

The second indication may be e.g., x bits in an Uplink Control Information (UCI).

The sending in this Action 303 may be performed, e.g., via the link 140.

Action 304

In this Action 304, the first communication device 101 initiates sending the uplink transmission to the second communication device 102, based on the selected second set of parameters. The UL transmission may carry e.g., the URLLC traffic.

Initiating sending in this Action 304 may be understood to comprise sending or transmitting, or triggering the sending or the transmitting of the uplink transmission.

The sending in this Action 304 may be performed, e.g., via the link 140.

In some embodiments, the uplink transmission may be a block of information comprising at least one of: URLLC traffic and another type of traffic with a different quality of service requirement, e.g., eMBB traffic. The block of information may be transmitted by one of the following options. According to a first option, the block of information may be transmitted by multiplexing the URLLC traffic and the another type of traffic into a single Protocol Data Unit (PDU), and applying the selected second set of parameters for transmitting the PDU. The selected second set of parameters may guarantee the certain quality of service requirement for URLLC traffic. According to a second option, the block of information may be transmitted by sending the URLLC traffic and the another type of traffic in separate PDUs. The selected second set of parameters may comprise different sets of second parameters comprising a first second set of parameters and a second second set of parameters, and the block of information may be transmitted by applying the different sets of second parameters to each PDU, wherein the first second set of parameters may guarantee the certain quality of service requirement for URLLC traffic, and it may be applied to the PDU comprising the URLLC traffic. According to a third option, the block of information may be transmitted by sending the URLLC traffic only in a PDU, that is a single PDU, wherein the selected second set of parameters may guarantee the certain quality of service requirement for URLLC traffic.

Embodiments of a method performed by the second communication device 102, will now be described with reference to the flowchart depicted in FIG. 4. The method may be understood to be for handling uplink transmissions based on quality of service requirements. The second communication device 102 operates in the wireless communications network 100.

The method may comprise one or more of the following actions. Several embodiments are comprised herein. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 4, an optional action is indicated with dashed boxes.

The detailed description of some of the following corresponds to the same references provided above, in relation to the actions described for the first communication device 101, and will thus not be repeated here to simplify the description. For example, any of the parameters comprised in the one or more first sets of parameters and/or the second set of parameters may be L1 parameters.

Action 401

As described earlier in relation to FIG. 1, the first communication device 101 may have sent a scheduling request to the second communication device 102 to be able to transmit the data in the UL with the particular quality of service requirement for the type of traffic of the data.

In order to be enable the first communication device 101 to send the data, in this Action 401, the second communication device 102 may send the grant to the first communication device 101. The grant is for the uplink transmission, e.g., the transport block, to the second communication device 102.

In some embodiments, the sending in this Action 401 of the grant may comprise at least one of: a) sending the grant in the message, the message being one of: the downlink control information message, and the message sent during radio resource control signalling; and b) sending the grant on the downlink control channel.

The grant may be based on a configuration of the first communication device 101 allowing the grant to be obtained.

The sending in this Action 401 may be performed, e.g., via the link 140.

Action 402

After the second communication device 102 may have sent the grant in Action 401, in this Action 402, the second communication device 102 receives the second indication of the selected second set of parameters from the first communication device 101 operating in the wireless communications network 100. The second set of parameters is for the uplink transmission to the second communication device 102. The second set of parameters has been selected by the first communication device 101 from the one or more first sets of parameters for transmission indicated by the first indication comprised in the grant for the uplink transmission. The selected second set of parameters has been selected based on: i) the indicated one or more first sets of parameters, and ii) the one or more quality of service requirements of the information transmitted in the uplink transmission.

As stated earlier, the selected second set of parameters may guarantee the certain quality of service. In some embodiments, the selected second set of parameters may guarantee the certain quality of service when the uplink transmission is to comprise URLLC traffic.

The receiving in this Action 402 may be performed, e.g., via the link 140.

Action 403

In this Action 404, the first communication device 101 initiates reception of the uplink transmission from the first communication device 101, based on the indicated second set of parameters. The UL transmission may carry e.g., the URLLC traffic.

To initiating reception in this Action 403 may be understood to comprise receiving, e.g., via the link 140.

In some embodiments, the uplink transmission may be a block of information comprising at least one of: URLLC traffic and another type of traffic with a different quality of service requirement, e.g., eMBB traffic. The block of information may be received according to one of the following options. According to a first option, the block of information may be received according to multiplexing the URLLC traffic and the another type of traffic into the single PDU. The second communication device 102 may apply the selected second set of parameters for transmitting the PDU. The selected second set of parameters may guarantee a certain quality of service requirement for URLLC traffic. According to a second option, the block of information may be received with at least one of: the URLLC traffic and the another type of traffic, in separate PDUs. The selected second set of parameters may comprise different sets of second parameters comprising the first second set of parameters and the second second set of parameters. The second communication device 102 may apply the different sets of second parameters to each PDU. The first second set of parameters may guarantee the certain quality of service requirement for URLLC traffic, and it may be applied to the PDU comprising the URLLC traffic. According to a third option, the block of information may be received with the URLLC traffic only in the PDU, wherein the selected second set of parameters may guarantee the certain quality of service requirement for URLLC traffic.

EXAMPLES OF EMBODIMENTS HEREIN

An illustrative overview of embodiments herein with particular examples will now be provided. In the following description, any reference to a/the UE may be understood to equally refer to the first communication device 101. Any reference herein to a/the eNB or the network may be understood to equally refer to the second communication device 102.

According to examples of embodiments herein, there may be two sets of parameters, e.g., L1 parameters, configured. One set (Set 1) may be for URLLC traffic UL transmission, in order to provide higher reliability, and another set (set 2) may be for non-URLLC traffic UL transmission, in order to provide higher resource efficiency. This may be further extended to other traffic types like eMBB, Massive Machine Type Communications (M-MTC), etc. . . . .

The parameters in the set may include, but not be limited to, Transmission Time Interval (TTI) bundling indicator, MCS level, TX power, Cyclic Redundancy Check (CRC) length, etc. . . . . Either or both sets of parameters may be dynamically, e.g., Downlink Control Information (DCI), and/or statically configured, e.g., Medium Access Control (MAC) Control Element (CE), Radio Resource Control (RRC), by the network.

For an UL grant, e.g., an UL grant provided by the network as described in Action 301, the UE may decide on the applied set of L1 parameters according to the type of traffic to be put into the UL grant, according to Action 302. In a particular example, the one or more first sets of parameters for transmission described in Action 301 may belong to set 2, e.g., if initially the data to be transmitted is URLLC traffic. If a single type of traffic, either URLLC or non-URLLC traffic is to be put into the UL grant, then set 1 or 2 may be selected accordingly. If both types of traffic co-exist within the UL grant, then either a single set may need to be selected, or both sets may be selected in order for a mixed UL transmission. For example, the second set of parameters for the uplink transmission described in Action 302 may belong to set 1, or a mixture of set 1 and set 2 parameters, or e.g., a subset of set 2 parameters. The decision at the UE side may be notified to the network at the Physical layer (PHY), as described in Action 303.

The following is a further detailed description of examples herein, as just summarized.

Step 1: there may be two sets of L1 parameters configured, via Physical Downlink Control Channel (PDCCH)/ Medium Access Control (MAC) Control Element (CE)/ Radio Resource Control (RRC9, only, or in a combined way.

If the current design of PDCCH format 0 is considered, for example:

Flag to differentiate between Format 0 and Format 1A;
Resource assignment and frequency hopping flag;
Modulation and Coding Scheme (MCS);
New Data Indicator (NDI);
Hybrid Automatic Retransmission reQuest (HARQ) information and Redundancy Version (RV), in Transport Format (TF);
Transmission Time Interval (TTI) bundling indication
Power control command for scheduled Physical UL Shared Channel (PUSCH);
Cyclic shift for uplink Demodulation Reference Signal (RS);
Request for transmission of an aperiodic Channel Quality Indicator (CQI) report These parameters, especially MCS and Transmitter Power Control (TPC) command, possibly some others which are all marked as above, may vary between URLLC and non-URLLC traffic in order for provide for different trade-off between resource efficiency and reliability. Therefore, two sets of L1 parameters may be needed for different QoS requirements, respectively.

The implementation of the parameters may be different, e.g., it may be that: a) both sets of parameters are included in PDCCH, b) one set may be included in PDCCH, while the other may be pre-configured in Radio Resource Control (RRC), or even fixed in specification, or c) one set may be included in PDCCH while the other may be decided by UE.

Therefore, to support the multiplexing of URLLC and non-URLLC or selection on the either of them, the following alternatives may be implemented. According to a first alternative, a new Downlink Control Information (DCI), format including both sets of parameters may be defined to support the multiplexing. A second alternative may be to re-use the existing DCI formats, and an extra information as the offset to the values in DCI may be defined and inserted into the DCI or included in RRC. A second alternative may be to keep the DCI as the same as in existing methods, and the offset may be decided by UE, and indicated in the explicit information bits, as explained below.

The obtaining Action 301 of the grant for the uplink transmission may be performed e.g., based on the description provided in "Step 1" above.

Step 2: Transport Block (TB) generation. In this action, the UE may decide on the type(s) of traffic to be put into one UL grant, that is, to do the logical channel prioritization. Here it may be noted that the other traffic types like MAC CE types, and Signalling Radio Bearers (SRBs) are not considered, but focus is placed on the Data Radio Bearer (DRB) types. Afterwards, the UE may perform TTI bundling and decide on the corresponding set of L1 parameters to be applied for the generated MAC Protocol Data Unit (PDU), in accordance with Action 302. Or, in case that both types of traffic, e.g., both URLLC and non-URLLC, may be used to generate the TB, there may be two options. A first option (Option 1) may be to use the L1 parameters of URLLC traffic in order to secure the QoS requirement of URLLC, as a way of conservative option. This option may be applicable as the legacy way, that is, when both URLLC and non-URLLC are multiplexed into one MAC PDU, only URLLC Physical layer (PHY) parameters may be used. Two MAC Service Data Units (SDUs) may be used, so that a single type of L1 parameters set may be used for the single MAC PDU. Besides, to support different QoS requirements of URLLC and eMBB, additional redundancy may be provided for URLLC at layers above PHY, e.g., to send duplicated MAC SDU for URLLC traffic, TTI bundling etc. A second option (Option 2) may be to use an enhanced solution, to mix the two sets of parameters. It may be used to generate the TB in two ways as follows. Two MAC PDUs may be used, for URLLC and non-URLLC traffics, so that to support different QoS requirements of URLLC and eMBB, different Cyclic Redundancy Check (CRC) may need to be applied to each MAC PDU. The two MAC PDUs used may occupy different time/frequency/spatial resources. The resource division may be pre-configured. For example, one or multiple options for the resource division may be given on how to split the resources in time/frequency/spatial domain, as option A, B, C . . . , e.g., option A may be to divide resource between URLLC and non-URLLC as 1:7, option B as 2:6 . . . and altogether 8 options, where the available options may be fixed by specification, or pre-configured by RRC/MAC CE/DCI.

The selecting in Action 302 of the second set of parameters may be performed e.g., based on the description provided in "Step 2" above.

Option 1 described earlier may be considered examples of the selected second set of parameters being one of: a) selected from the first first set of parameters and the second first set of parameters of the indicated one or more first sets of parameters, c) different from any of the one or more first sets of parameters indicated in the grant, the grant being obtained from the second communication device 102, and d) different from any of the one or more first sets of parameters indicated in the grant, the grant being obtained from a configuration of the first communication device 101 for uplink transmission.

Option 2 described earlier may be considered examples of the selected second set of parameters being one of: b) a combination of parameters selected from the indicated one or more first sets of parameters, c) different from any of the one or more first sets of parameters indicated in the grant, the grant being obtained from the second communication device 102, and d) different from any of the one or more first sets of parameters indicated in the grant, the grant being obtained from a configuration of the first communication device 101 for uplink transmission.

Step 3: In order for eNB reception, the adopted L1 parameter set and/or the split option may need to be notified to network. Either the UE may indicate the adopted set(s) by PHY layer features. For example, different cyclic shift of DeModulation Reference Signal (DMRS) may be defined for two sets, and when it is adopted by the UE, it may be used as features for the eNB to judge on the parameters used by the UE, to guide the further decoding operations. Alternatively, Uplink Control Information (UCI) may be used to indicate that explicitly, e.g., x bits in the UCI explicitly. Yet another alternative may be to rely on eNB blind detection to test the possible hypothesis, in order for final correct decoding. In this case, once an adoption or an indication on the different traffic is detected, the eNB may adopt the corresponding parameters to demodulate the data.

The description of Step 3 provided above may be considered to provide examples of the sending of the second indication, as described in Action 303.

According to the foregoing, embodiments herein may be understood to be related to a first communication device 101 selecting a set of parameters for an uplink transmission based on one or more quality of service requirements of an information to be transmitted in the uplink transmission. The selecting may be further based on one or more first sets of parameters which may be configured for uplink transmission, e.g., in a particular block of information, such as a transport block. Some embodiments herein may be understood to be related to a first communication device 101 selecting between a first first set of parameters for an uplink transmission and a second first set of parameters for uplink transmission, the selecting being based on one or more quality of service requirements of an information to be transmitted in the uplink transmission.

One advantage of embodiments herein is that the methods described enable to optimize the resource efficiency, latency, and/or robustness for e.g., URLLC via allowing a different multiplexing mechanism design, e.g., in NR.

Figure 5:
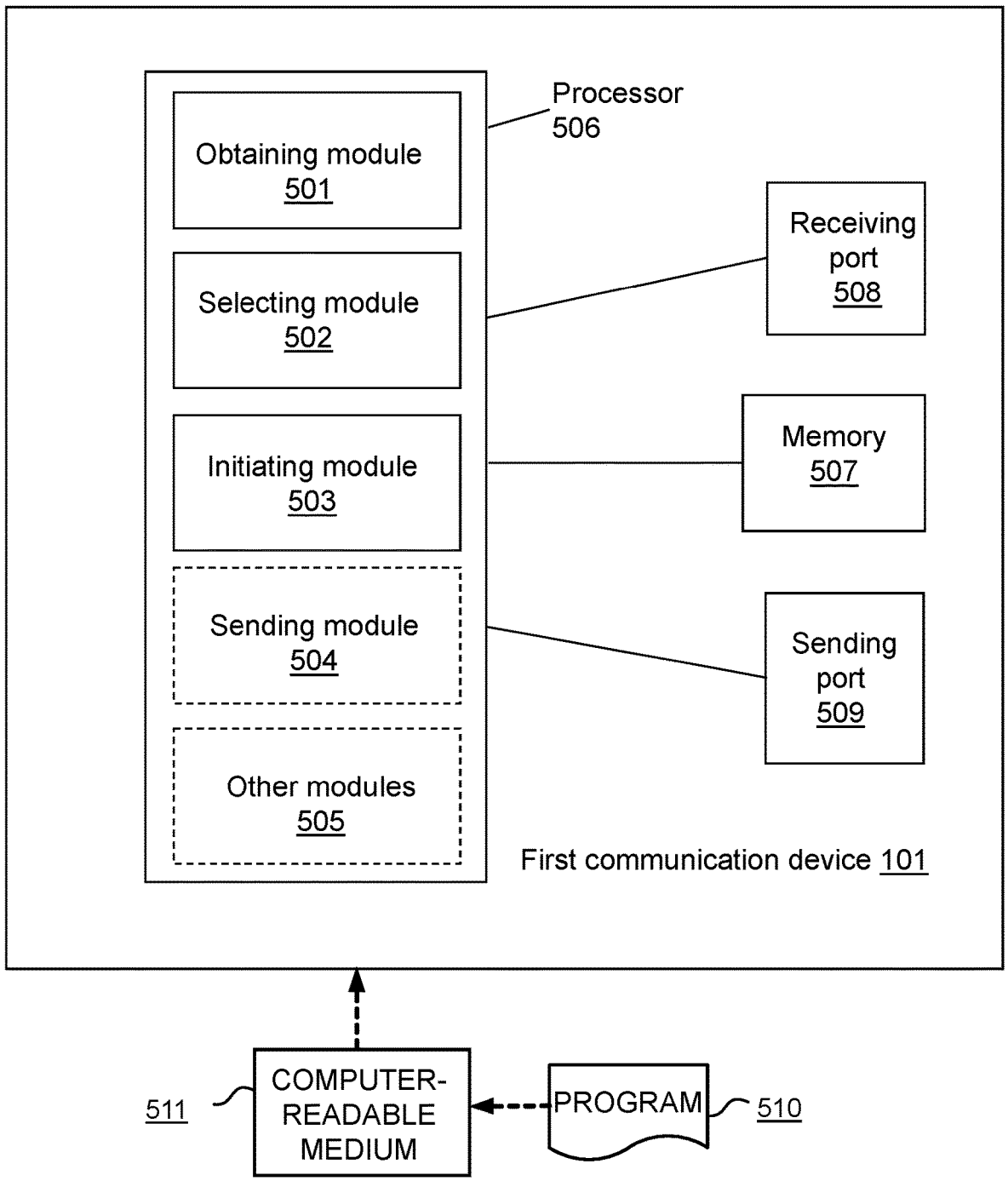
FIG. 5 is a schematic block diagram illustrating embodiments of a first communication device, according to embodiments herein.

To perform the method actions described above in relation to FIG. 3, the first communication device 101 may comprise the following arrangement depicted in FIG. 5. The first communication device 101 is configured to operate in the wireless communications network 100.

The detailed description of some of the following corresponds to the same references provided above, in relation to the actions described for the first communication device 101, and will thus not be repeated here. For example, the uplink transmission may be a transport block.

The first communication device 101 is configured to, e.g. by means of an obtaining module 501 within the first communication device 101 configured to, obtain the grant for the uplink transmission to the second communication device 102 configured to operate in the wireless communications network 100. The grant comprises the first indication of one or more first sets of parameters for transmission.

The first communication device 101 is also configured to, e.g. by means of a selecting module 502 within the first communication device 101 configured to, select the second set of parameters for the uplink transmission based on: i) the one or more first sets of parameters configured to be indicated, and ii) the one or more quality of service requirements of the information configured to be transmitted in the uplink transmission.

The first communication device 101 is further configured to, e.g. by means of an initiating module 503 within the first communication device 101 configured to, send the uplink transmission to the second communication device 102, based on the second set of parameters configured to be selected.

In some embodiments, the second set of parameters configured to be selected may be one of: a) selected from the first first set of parameters and the second first set of parameters of the one or more first sets of parameters that may be configured to be indicated, b) the combination of parameters selected from the one or more first sets of parameters configured to be indicated, c) different from any of the one or more first sets of parameters configured to be indicated in the grant; wherein the grant being may be configured to be obtained from the second communication device 102, and d) different from any of the one or more first sets of parameters configured to be indicated in the grant, wherein the grant may be configured to be obtained from the configuration of the first communication device 101 for uplink transmission.

To obtain the grant for the uplink transmission may comprise at least one of: a) to receive the grant from the second communication device 102 in the message, b) to receive the grant from the second communication device 102 on the downlink control channel, c) to autonomously determine, and d) the first communication device 101 to obtain the grant based on the configuration of the first communication device 101, which may be configured to allow the grant to be obtained.

In some embodiments, the message may be one of: the downlink control information message, and the message that may be configured to be received during radio resource control signalling.

The second set of parameters configured to be selected may be configured to guarantee the certain quality of service.

In some embodiments, the second set of parameters configured to be selected may be configured to guarantee the certain quality of service when the uplink transmission is to comprise URLLC traffic.

In some embodiments, the first communication device 101 may be further configured to, e.g. by means of a sending module 504 within the first communication device 101 configured to, send the second indication of the second set of parameters configured to be selected to the second communication device 102.

In some embodiments, the uplink transmission may be the block of information comprising at least one of: the URLLC traffic and the another type of traffic with the different quality of service requirement. The block of information may be configured to be sent by the first communication device 101 by one of: a) multiplexing the URLLC traffic and the another type of traffic into the single PDU and applying the second set of parameters configured to be selected for sending the PDU, wherein the second set of parameters configured to be selected may be configured to guarantee the certain quality of service requirement for URLLC traffic; b) sending the URLLC traffic and the another type of traffic in separate PDUs, wherein the second set of parameters configured to be selected may comprise different sets of second parameters comprising the first second set of parameters and the second second set of parameters, and applying the different sets of second parameters to each PDU. The first second set of parameters may be configured to guarantee the certain quality of service requirement for URLLC traffic, and it may be configured to be applied to the PDU comprising the URLLC traffic, and c) sending the URLLC traffic only in a PDU, wherein the second set of parameters configured to be selected may be configured to guarantee the certain quality of service requirement for URLLC traffic.

The embodiments herein may be implemented through one or more processors, such as a processor 506 in the first communication device 101 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the first communication device 101. One such carrier may be in the form of a CD ROM disc. It is however feasible with other data carriers such as a memory stick. The computer program code may furthermore be provided as pure program code on a server and downloaded to the first communication device 101.

The first communication device 101 may further comprise a memory 507 comprising one or more memory units. The memory 507 is arranged to be used to store obtained information, store data, configurations, schedulings, and applications etc. to perform the methods herein when being executed in the first communication device 101.

In some embodiments, the first communication device 101 may receive information from the second communication device 102 through a receiving port 508. In some embodiments, the receiving port 508 may be, for example, connected to one or more antennas in the first communication device 101. In other embodiments, the first communication device 101 may receive information from another structure in the wireless communications network 100 through the receiving port 508. Since the receiving port 508 may be in communication with the processor 506, the receiving port 508 may then send the received information to the processor 506. The receiving port 508 may also be configured to receive other information.

The processor 506 in the first communication device 101 may be further configured to transmit or send information to e.g., the second communication device 102, through a sending port 509, which may be in communication with the processor 506, and the memory 507.

Those skilled in the art will also appreciate that the obtaining module 501, the selecting module 502, the initiating module 503, the sending module 504, and the other modules 505 described above may refer to a combination of analog and digital modules, and/or one or more processors configured with software and/or firmware, e.g., stored in memory, that, when executed by the one or more processors such as the processor 506, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 501-505 described above may be implemented as one or more applications running on one or more processors such as the processor 506.

Thus, the methods according to the embodiments described herein for the first communication device 101 may be respectively implemented by means of a computer program 510 product, comprising instructions, i.e., software code portions, which, when executed on at least one processor 506, cause the at least one processor 506 to carry out the actions described herein, as performed by the first communication device 101. The computer program 510 product may be stored on a computer-readable storage medium 511. The computer-readable storage medium 511, having stored thereon the computer program 510, may comprise instructions which, when executed on at least one processor 506, cause the at least one processor 506 to carry out the actions described herein, as performed by the first communication device 101. In some embodiments, the computer-readable storage medium 511 may be a non-transitory computer-readable storage medium, such as a CD ROM disc, a memory stick, or stored in the cloud space. In other embodiments, the computer program 510 product may be stored on a carrier containing the computer program, wherein the carrier is one of an electronic signal, optical signal, radio signal, or the computer-readable storage medium 511, as described above.

Figure 6:
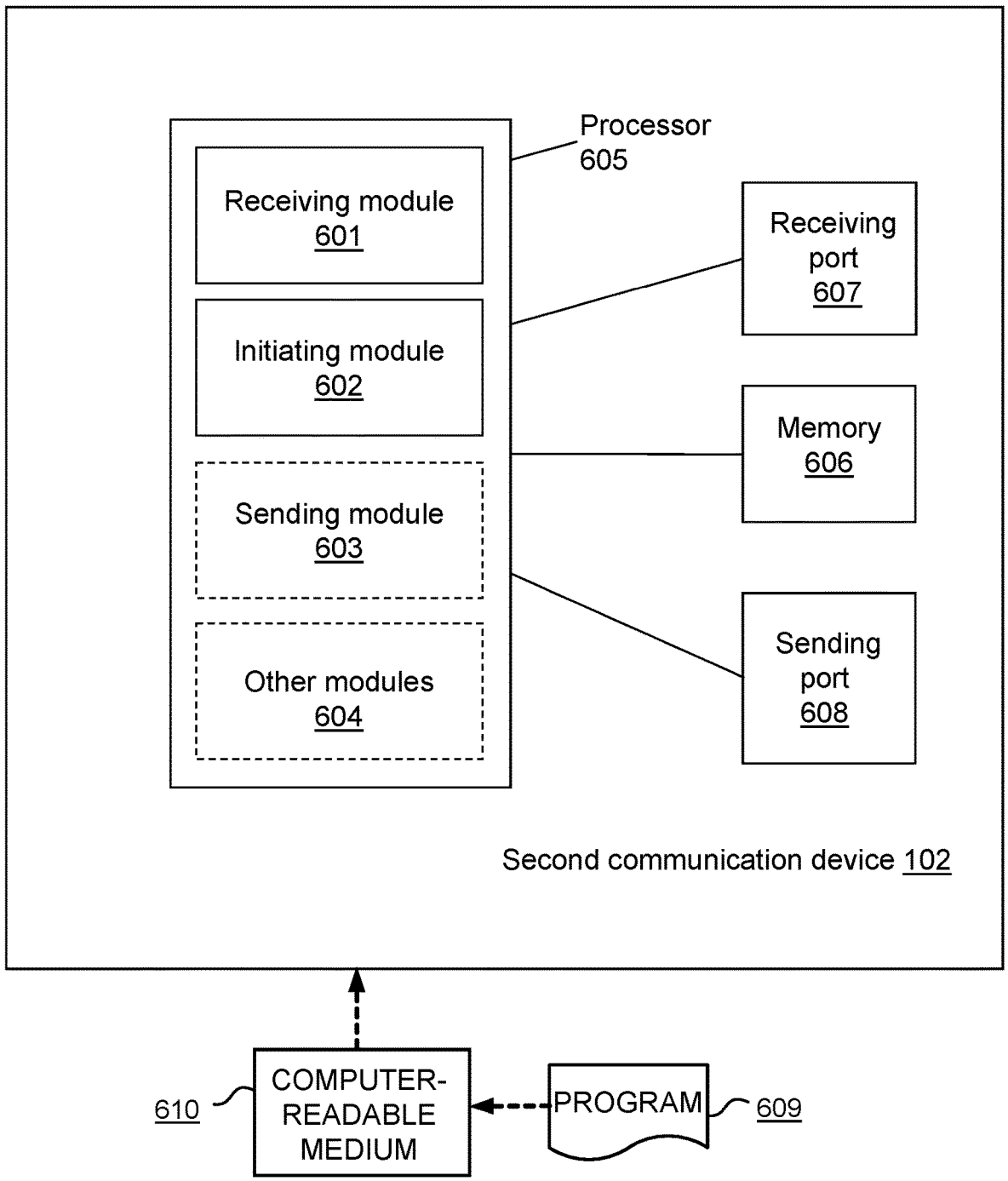
FIG. 6 is a schematic block diagram illustrating embodiments of a second communication device, according to embodiments herein.

To perform the method actions described above in relation to FIG. 4, the second communication device 102 may comprise the following arrangement depicted in FIG. 6. The second communication device 102 is configured to operate in the wireless communications network 100.

The detailed description of some of the following corresponds to the same references provided above, in relation to the actions described for the second communication device 102, and will thus not be repeated here. For example, the uplink transmission may be a transport block.

The second communication device 102 is configured to, e.g. by means of a receiving module 601 within the second communication device 102 configured to, receive the second indication of the selected second set of parameters from the first communication device 101 configured to operate in the wireless communications network 100. The second set of parameters is for the uplink transmission to the second communication device 102. The second set of parameters is configured to have been selected by the first communication device 101 from the one or more first sets of parameters for transmission configured to be indicated by a first indication comprised in the grant for the uplink transmission. The selected second set of parameters is configured to have been selected based on: i) the one or more first sets of parameters configured to be indicated, and ii) the one or more quality of service requirements of the information configured to be transmitted in the uplink transmission.

The second communication device 102 is also configured to, e.g. by means of an initiating module 602 within the second communication device 102 configured to, initiate reception of the uplink transmission from the first communication device 101, based on the second set of parameters configured to be indicated.

In some embodiments, the selected second set of parameters may be configured to be one of: a) selected from the first first set of parameters and the second first set of parameters of the one or more first sets of parameters that may be configured to be indicated, b) the combination of parameters selected from the one or more first sets of parameters configured to be indicated, c) different from any of the one or more first sets of parameters configured to be indicated in the grant; wherein the grant being may be configured to have been sent by the second communication device 102, and d) different from any of the one or more first sets of parameters configured to be indicated in the grant, wherein the grant may be configured to be obtained from the configuration of the first communication device 101 for uplink transmission.

In some embodiments, the second communication device 102 may be further configured to, e.g. by means of a sending module 602 within the second communication device 102 configured to, send the grant to the first communication device 101.

In some embodiments, to send the grant may comprise at least one of: a) to send the grant in the message, the message being one of: the downlink control information message, and the message that may be configured to be sent during radio resource control signalling; and b) to send the grant on the downlink control channel.

In some embodiments, the grant may be configured to be based on the configuration of the first communication device 101 configured to allow the grant to be obtained.

The selected second set of parameters may be configured to guarantee the certain quality of service.

In some embodiments, the selected second set of parameters may be configured to guarantee the certain quality of service when the uplink transmission is to comprise URLLC traffic.

In some embodiments, the uplink transmission may be the block of information comprising at least one of: the URLLC traffic and the another type of traffic with the different quality of service requirement. The block of information may be configured to be one of: a) configured to be received according to multiplexing the URLLC traffic and the another type of traffic into the single PDU, and wherein the first communication device 101 may be further configured to apply the selected second set of parameters for transmitting the PDU; the selected second set of parameters may be configured to guarantee the certain quality of service requirement for URLLC traffic, b) configured to be received with the URLLC traffic and the another type of traffic in separate PDUs, wherein the selected second set of parameters may comprise different sets of second parameters comprising the first second set of parameters and the second second set of parameters, and wherein the first communication device 101 may be further configured to apply the different sets of second parameters to each PDU; the first second set of parameters may be configured to guarantee the certain quality of service requirement for URLLC traffic, and the first communication device 101 may be further configured to apply the first second set of parameters to the PDU comprising the URLLC traffic, and c) configured to be received with the URLLC traffic only in a PDU; the selected second set of parameters may be configured to guarantee the certain quality of service requirement for URLLC traffic.

The embodiments herein may be implemented through one or more processors, such as a processor 605 in the second communication device 102 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the in the second communication device 102. One such carrier may be in the form of a CD ROM disc. It is however feasible with other data carriers such as a memory stick. The computer program code may furthermore be provided as pure program code on a server and downloaded to the second communication device 102.

The second communication device 102 may further comprise a memory 606 comprising one or more memory units. The memory 606 is arranged to be used to store obtained information, store data, configurations, schedulings, and applications etc. to perform the methods herein when being executed in the second communication device 102.

In some embodiments, the second communication device 102 may receive information from the first communication device 101, the radio network node 110 and/or the wireless device 140, through a receiving port 607. In some embodiments, the receiving port 607 may be, for example, connected to one or more antennas in the second communication device 102. In other embodiments, the second communication device 102 may receive information from another structure in the wireless communications network 100 through the receiving port 607. Since the receiving port 607 may be in communication with the processor 605, the receiving port 607 may then send the received information to the processor 605. The receiving port 607 may also be configured to receive other information.

The processor 605 in the second communication device 102 may be further configured to transmit or send information to e.g., the first communication device 101, through a sending port 608, which may be in communication with the processor 605, and the memory 606.

Those skilled in the art will also appreciate that the receiving module 601, the initiating module 602, the sending module 603, and the other modules 604 described above may refer to a combination of analog and digital modules, and/or one or more processors configured with software and/or firmware, e.g., stored in memory, that, when executed by the one or more processors such as the processor 605, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 601-604 described above may be implemented as one or more applications running on one or more processors such as the processor 605.

Thus, the methods according to the embodiments described herein for the second communication device 102 may be respectively implemented by means of a computer program 609 product, comprising instructions, i.e., software code portions, which, when executed on at least one processor 605, cause the at least one processor 605 to carry out the actions described herein, as performed by the second communication device 102. The computer program 609 product may be stored on a computer-readable storage medium 610. The computer-readable storage medium 610, having stored thereon the computer program 609, may comprise instructions which, when executed on at least one processor 605, cause the at least one processor 605 to carry out the actions described herein, as performed by the second communication device 102. In some embodiments, the computer-readable storage medium 610 may be a non-transitory computer-readable storage medium, such as a CD ROM disc, a memory stick, or stored in the cloud space. In other embodiments, the computer program 609 product may be stored on a carrier containing the computer program, wherein the carrier is one of an electronic signal, optical signal, radio signal, or the computer-readable storage medium 610, as described above.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Further Examples Related to Embodiments Herein:

Below some example Embodiments 1-52 are described:
The following embodiments refer to FIG. 3.

Embodiment 1

A method performed by a first communication device (101) operating in a wireless communications network (100), the method comprising:
- obtaining (301) a grant for an uplink transmission to a second communication device (102) operating in the wireless communications network (100), the grant comprising a first indication of one or more first sets of parameters for transmission,
- selecting (302) a second set of parameters for the uplink transmission based on:
  - i. the indicated one or more first sets of parameters, and
  - ii. one or more quality of service requirements of an information to be transmitted in the uplink transmission, and
- initiating (304) sending the uplink transmission to the second communication device (102), based on the selected second set of parameters.

The grant for the uplink transmission may be understood as an uplink grant.

The uplink transmission may be a transport block.

The parameters for transmission may be e.g., MCS, a TTI bundling indicator, a TPC command, etc. . . . as the parameters described above.

Any of the parameters comprised in the one or more first sets of parameters and/or the second set of parameters may be L1 parameters.

The obtaining (301) of the grant for the uplink transmission may be performed e.g., based on the description provided in "Step 1" above.

The selecting (302) of the second set of parameters may be performed e.g., based on the description provided in "Step 2" above.

Initiating sending (304) may be understood to comprise sending or transmitting, or triggering the sending or the transmitting of the uplink transmission.

Selecting may be understood in some examples as obtaining or creating, whereas in others it may be adjusting at least one parameter in at least one set of the one or more first sets of parameters.

Embodiment 2

The method according to embodiment 1, wherein the selected second set of parameters is one of:
a. selected from a first first set of parameters and a second first set of parameters of the indicated one or more first sets of parameters;
b. a combination of parameters selected from the indicated one or more first sets of parameters;
c. different from any of the one or more first sets of parameters indicated in the grant, the grant being obtained from the second communication device (102); and
d. different from any of the one or more first sets of parameters indicated in the grant, the grant being obtained from a configuration of the first communication device (101) for uplink transmission.

Option 1 described earlier may be considered examples of "a.", "c." and "d.".

Option 2 described earlier may be considered examples of "b.", "c." and "d.".

Embodiment 3

The method according to any of embodiments 1-2, wherein the obtaining (301) of the grant for the uplink transmission comprises at least one of:
a. receiving the grant from the second communication device (102) in a message;
b. receiving the grant from the second communication device (102) on a downlink control channel,
c. autonomous determination, and
d. the first communication device (101) obtaining the grant based on a configuration of the first communication device (101) allowing the grant to be obtained.

Embodiment 4

The method according to embodiment 3, wherein the message is one of: a downlink control information message, and a message received during radio resource control signalling.

Embodiment 5

The method according to any of embodiments 1-4, wherein the selected second set of parameters guarantees a certain quality of service.

Embodiment 6

The method according to embodiment 5, wherein the selected second set of parameters guarantees the certain quality of service when the uplink transmission is to comprise Ultra Reliable and Low Latency, URLLC, traffic.

Embodiment 7

The method according to any of embodiments 1-6, further comprising:
- sending (303) a second indication of the selected second set of parameters to the second communication device (102).

The description of Step 3 provided above may be considered to provide examples of the sending of the second indication. The second indication may be e.g., x bits in a UCI.

Embodiment 8

The method of according to any of embodiments 1-7, wherein the uplink transmission is a block of information comprising URLLC traffic and another type of traffic with a different quality of service requirement, and wherein the block of information is transmitted by one of:
  a. multiplexing the URLLC traffic and the another type of traffic into a single Protocol Data Unit, PDU, and applying the selected second set of parameters for transmitting the PDU, wherein the selected second set of parameters guarantees a certain quality of service requirement for URLLC traffic, and
  b. sending the URLLC traffic and the another type of traffic in separate PDUs, wherein the selected second set of parameters comprises different sets of second parameters comprising a first second set of parameters and a second second set of parameters, and applying the different sets of second parameters to each PDU, wherein the first second set of parameters guarantees a certain quality of service requirement for URLLC traffic, and it is applied to the PDU comprising the URLLC traffic.

Embodiment 9

A computer program (510), comprising instructions which, when executed on at least one processor (506), cause the at least one processor (506) to carry out the method according to any one of embodiments 1 to 8.

Embodiment 10

A computer-readable storage medium (511), having stored thereon a computer program (510), comprising instructions which, when executed on at least one processor (506), cause the at least one processor (506) to carry out the method according to any one of embodiments 1 to 8.

Figure 4:
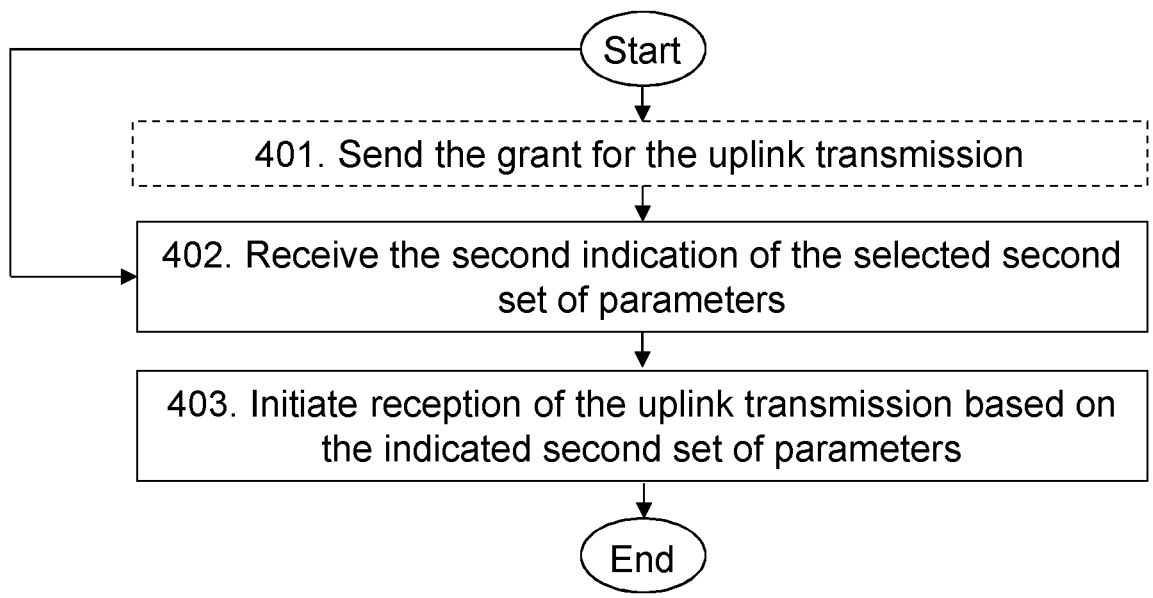
FIG. 4 is a flowchart depicting embodiments of a method performed by a second communication device, according to embodiments herein.

The following embodiments refer to FIG. 4.

Embodiment 11

A method performed by a second communication device (102) operating in a wireless communications network (100), the method comprising:
  receiving (402) a second indication of a selected second set of parameters from a first communication device (101) operating in the wireless communications network (100), the second set of parameters being for an uplink transmission to the second communication device (102), the second set of parameters having been selected by the first communication device (101) from one or more first sets of parameters for transmission indicated by a first indication comprised in a grant for the uplink transmission, the selected second set of parameters having been selected based on:
    i. the indicated one or more first sets of parameters, and
    ii. one or more quality of service requirements of an information transmitted in the uplink transmission, and
  initiating (403) reception of the uplink transmission from the first communication device (101), based on the indicated second set of parameters.
Initiating (403) reception may comprise any of processing, decoding, demodulating, Embodiment 12

The method according to embodiment 11, wherein the selected second set of parameters is one of:
  a. selected from a first first set of parameters and a second first set of parameters of the indicated one or more first sets of parameters;
  b. a combination of parameters selected from the indicated one or more first sets of parameters;
  c. different from any of the one or more first sets of parameters indicated in the grant, the grant having been sent by the second communication device (102); and
  d. different from any of the one or more first sets of parameters indicated in the grant, the grant having been obtained from a configuration of the first communication device (101) for uplink transmission.

Embodiment 13

The method according to any of embodiments 11-12, the method further comprising:
  sending (401) the grant to the first communication device (101).

Embodiment 14

The method according to embodiment 13, wherein the sending (401) of the grant comprises at least one of:
  a. sending the grant in a message, the message being one of: a downlink control information message, and a message sent during radio resource control signalling; and
  b. sending the grant on a downlink control channel.

Embodiment 15

The method according to any of embodiments 11-12, wherein the grant is based on a configuration of the first communication device (101) allowing the grant to be obtained.

Embodiment 16

The method according to any of embodiments 11-15, wherein the selected second set of parameters guarantees a certain quality of service.

Embodiment 17

The method according to embodiment 16, wherein the selected second set of parameters guarantees the certain quality of service when the uplink transmission is to comprise Ultra Reliable and Low Latency, URLLC, traffic.

Embodiment 18

The method according to any of embodiments 11-17, wherein the uplink transmission is a block of information comprising URLLC traffic and another type of traffic with a different quality of service requirement, and wherein the block of information is one of:
  a. received according to multiplexing the URLLC traffic and the another type of traffic into a single Protocol Data Unit, PDU, and wherein the second communication device (102) applies the selected second set of parameters for transmitting the PDU, wherein the selected second set of parameters guarantees a certain quality of service requirement for URLLC traffic, and
  b. received with the URLLC traffic and the another type of traffic in separate PDUs, wherein the selected second set of parameters comprises different sets of second parameters comprising a first second set of parameters and a second second set of parameters, and wherein the second communication device (102) applies the different sets of second parameters to each PDU, wherein the first second set of parameters guarantees a certain quality of service requirement for URLLC traffic, and it is applied to the PDU comprising the URLLC traffic.

Embodiment 19

A computer program (609), comprising instructions which, when executed on at least one processor (605), cause the at least one processor (605) to carry out the method according to any one of embodiments 11 to 18.

Embodiment 20

A computer-readable storage medium (610), having stored thereon a computer program (609), comprising instructions which, when executed on at least one processor (605), cause the at least one processor (605) to carry out the method according to any one of embodiments 11 to 18.

To perform the method actions performed by the first communication device (101), the first communication device (101), may comprise the following arrangement described below and depicted in FIG. 5.

Embodiment 21

A first communication device (101), the first communication device (101) being configured to operate in a wireless communications network (100), the first communication device (101) comprising:
- an obtaining module (501) configured to obtain a grant for an uplink transmission to a second communication device (102) configured to operate in the wireless communications network (100), the grant comprising a first indication of one or more first sets of parameters for transmission,
- a selecting module (502) configured to select a second set of parameters for the uplink transmission based on:
  - i. the one or more first sets of parameters configured to be indicated, and
  - ii. one or more quality of service requirements of an information configured to be transmitted in the uplink transmission, and
- an initiating module (503) configured to send the uplink transmission to the second communication device (102), based on the second set of parameters configured to be selected.

Embodiment 22

The first communication device (101) according to embodiment 21, wherein the second set of parameters configured to be selected is one of:
- a. selected from a first first set of parameters and a second first set of parameters of the one or more first sets of parameters configured to be indicated;
- b. a combination of parameters selected from the one or more first sets of parameters configured to be indicated;
- c. different from any of the one or more first sets of parameters configured to be indicated in the grant, the grant being configured to be obtained from the second communication device (102); and
- d. different from any of the one or more first sets of parameters configured to be indicated in the grant, the grant being configured to be obtained from a configuration of the first communication device (101) for uplink transmission.

Embodiment 23

The first communication device (101) according to any of embodiments 21-22, wherein to obtain the grant for the uplink transmission comprises at least one of:
- a. to receive the grant from the second communication device (102) in a message;
- b. to receive the grant from the second communication device (102) on a downlink control channel,
- c. to autonomously determine, and
- d. the first communication device (101) to obtain the grant based on a configuration of the first communication device (101) configured to allowing the grant to be obtained.

Embodiment 24

The first communication device (101) according to embodiment 23, wherein the message is one of: a downlink control information message, and a message configured to be received during radio resource control signalling.

Embodiment 25

The first communication device (101) according to any of embodiments 21-24, wherein the second set of parameters configured to be selected is configured to guarantee a certain quality of service.

Embodiment 26

The first communication device (101) according to embodiment 25, wherein the second set of parameters configured to be selected are configured to guarantee the certain quality of service when the uplink transmission is to comprise Ultra Reliable and Low Latency, URLLC, traffic.

Embodiment 27

The first communication device (101) according to any of embodiments 21-26, further configured to:
- send a second indication of the second set of parameters configured to be selected to the second communication device (102).

Embodiment 28

The first communication device (101) according to any of embodiments 21-27, wherein the uplink transmission is a block of information comprising URLLC traffic and another type of traffic with a different quality of service requirement, and wherein the block of information is configured to be sent by the initiating module (503) configured by one of:
- a. multiplexing the URLLC traffic and the another type of traffic into a single Protocol Data Unit, PDU, and applying the second set of parameters configured to be selected for sending the PDU, wherein the second set of parameters configured to be selected is configured to guarantee a certain quality of service requirement for URLLC traffic, and
- b. sending the URLLC traffic and the another type of traffic in separate PDUs, wherein the second set of parameters configured to be selected comprises different sets of second parameters comprising a first second set of parameters and a second second set of parameters, and applying the different sets of second parameters to each PDU, wherein the first second set of parameters configured to guarantee a certain quality of service requirement for URLLC traffic, and it is configured to be applied to the PDU comprising the URLLC traffic.

Embodiment 29

A first communication device (101), the first communication device (101) being configured to operate in a wireless communications network (100), the first communication device (101) being further configured to:
  obtain a grant for an uplink transmission to a second communication device (102) configured to operate in the wireless communications network (100), the grant comprising a first indication of one or more first sets of parameters for transmission,
  select a second set of parameters for the uplink transmission based on:
    i. the one or more first sets of parameters configured to be indicated, and
    ii. one or more quality of service requirements of an information configured to be transmitted in the uplink transmission, and
  send the uplink transmission to the second communication device (102), based on the second set of parameters configured to be selected.

Embodiment 30

The first communication device (101) according to embodiment 29, wherein the second set of parameters configured to be selected is one of:
  a. selected from a first first set of parameters and a second first set of parameters of the one or more first sets of parameters configured to be indicated;
  b. a combination of parameters selected from the one or more first sets of parameters configured to be indicated;
  c. different from any of the one or more first sets of parameters configured to be indicated in the grant, the grant being configured to be obtained from the second communication device (102); and
  d. different from any of the one or more first sets of parameters configured to be indicated in the grant, the grant being configured to be obtained from a configuration of the first communication device (101) for uplink transmission.

Embodiment 31

The first communication device (101) according to any of embodiments 29-30, wherein to obtain the grant for the uplink transmission comprises at least one of:
  a. to receive the grant from the second communication device (102) in a message;
  b. to receive the grant from the second communication device (102) on a downlink control channel,
  c. to autonomously determine, and
  d. the first communication device (101) to obtain the grant based on a configuration of the first communication device (101) configured to allowing the grant to be obtained.

Embodiment 32

The first communication device (101) according to embodiment 31, wherein the message is one of: a downlink control information message, and a message configured to be received during radio resource control signalling.

Embodiment 33

The first communication device (101) according to any of embodiments 29-32, wherein the second set of parameters configured to be selected is configured to guarantee a certain quality of service.

Embodiment 34

The first communication device (101) according to embodiment 33, wherein the second set of parameters configured to be selected are configured to guarantee the certain quality of service when the uplink transmission is to comprise Ultra Reliable and Low Latency, URLLC, traffic.

Embodiment 35

The first communication device (101) according to any of embodiments 29-34, being further configured to:
  send a second indication of the second set of parameters configured to be selected to the second communication device (102).

Embodiment 36

The first communication device (101) according to any of embodiments 29-35, wherein the uplink transmission is a block of information comprising URLLC traffic and another type of traffic with a different quality of service requirement, and wherein the block of information is configured to be sent by the first communication device (101) by one of:
  a. multiplexing the URLLC traffic and the another type of traffic into a single Protocol Data Unit, PDU, and applying the second set of parameters configured to be selected for sending the PDU, wherein the second set of parameters configured to be selected is configured to guarantee a certain quality of service requirement for URLLC traffic, and
  b. sending the URLLC traffic and the another type of traffic in separate PDUs, wherein the second set of parameters configured to be selected comprises different sets of second parameters comprising a first second set of parameters and a second second set of parameters, and applying the different sets of second parameters to each PDU, wherein the first second set of parameters configured to guarantee a certain quality of service requirement for URLLC traffic, and it is configured to be applied to the PDU comprising the URLLC traffic.

To perform the method actions performed by the second communication device (102), the second communication device (102), may comprise the following arrangement described below and depicted in FIG. 6.

Embodiment 37

A second communication device (102) configured to operate in a wireless communications network (100), the second communication device (102) comprising:
  a receiving module (601) configured to receive a second indication of a selected second set of parameters from a first communication device (101) configured to operate in the wireless communications network (100), the second set of parameters being for an uplink transmission to the second communication device (102), the second set of parameters being configured to have been selected by the first communication device (101) from one or more first sets of parameters for transmission configured to be indicated by a first indication comprised in a grant for the uplink transmission, the selected second set of parameters being configured to have been selected based on:

i. the one or more first sets of parameters configured to be indicated, and ii. one or more quality of service requirements of an information configured to be transmitted in the uplink transmission, and an initiating module (602) configured to initiate reception of the uplink transmission from the first communication device (101), based on the second set of parameters configured to be indicated.

Embodiment 38

The second communication device (102) according to embodiment 37, wherein the selected second set of parameters is configured to be one of:

a. selected from a first first set of parameters and a second first set of parameters of the one or more first sets of parameters configured to be indicated;

b. a combination of parameters selected from the one or more first sets of parameters configured to be indicated;

c. different from any of the one or more first sets of parameters configured to be indicated in the grant, the grant being configured to have been sent by the second communication device (102); and d. different from any of the one or more first sets of parameters configured to be indicated in the grant, the grant being configured to have been obtained from a configuration of the first communication device (101) for uplink transmission.

Embodiment 39

The second communication device (102) according to any of embodiments 37-38, the second communication device (102) further comprising:

a sending module (603) configured to send the grant to the first communication device (101).

Embodiment 40

The second communication device (102) according to embodiment 39, wherein to send the grant comprises at least one of:

a. to send the grant in a message, the message being one of: a downlink control information message, and a message configured to be sent during radio resource control signalling; and b. to send the grant on a downlink control channel.

Embodiment 41

The second communication device (102) according to any of embodiments 37-40, wherein the grant is configured to be based on a configuration of the first communication device (101) configured to allow the grant to be obtained.

Embodiment 42

The second communication device (102) according to any of embodiments 37-41, wherein the selected second set of parameters is configured to guarantee a certain quality of service.

Embodiment 43

The second communication device (102) according to embodiment 42, wherein the selected second set of parameters is configured to guarantee the certain quality of service when the uplink transmission is to comprise Ultra Reliable and Low Latency, URLLC, traffic.

Embodiment 44

The second communication device (102) of according to any of embodiments 37-43, wherein the uplink transmission is a block of information comprising URLLC traffic and another type of traffic with a different quality of service requirement, and wherein the block of information is one of:

a. configured to be received according to multiplexing the URLLC traffic and the another type of traffic into a single Protocol Data Unit, PDU, and wherein the initiating module (602) is further configured to apply the selected second set of parameters for transmitting the PDU, wherein the selected second set of parameters is configured to guarantee a certain quality of service requirement for URLLC traffic, and b. configured to be received with the URLLC traffic and the another type of traffic in separate PDUs, wherein the selected second set of parameters comprises different sets of second parameters comprising a first second set of parameters and a second second set of parameters, and wherein the initiating module (602) is further configured to apply the different sets of second parameters to each PDU, wherein the first second set of parameters is configured to guarantee a certain quality of service requirement for URLLC traffic, and the initiating module (602) is further configured to apply the first second set of parameters to the PDU comprising the URLLC traffic.

Embodiment 45

A second communication device (102) configured to operate in a wireless communications network (100), the second communication device (102) being further configured to:

receive a second indication of a selected second set of parameters from a first communication device (101) configured to operate in the wireless communications network (100), the second set of parameters being for an uplink transmission to the second communication device (102), the second set of parameters being configured to have been selected by the first communication device (101) from one or more first sets of parameters for transmission configured to be indicated by a first indication comprised in a grant for the uplink transmission, the selected second set of parameters being configured to have been selected based on:

i. the one or more first sets of parameters configured to be indicated, and ii. one or more quality of service requirements of an information configured to be transmitted in the uplink transmission, and initiate reception of the uplink transmission from the first communication device (101), based on the second set of parameters configured to be indicated.

Embodiment 46

The second communication device (102) according to embodiment 45, wherein the selected second set of parameters is configured to be one of:
a. selected from a first first set of parameters and a second first set of parameters of the one or more first sets of parameters configured to be indicated;
b. a combination of parameters selected from the one or more first sets of parameters configured to be indicated;
c. different from any of the one or more first sets of parameters configured to be indicated in the grant, the grant being configured to have been sent by the second communication device (102); and
d. different from any of the one or more first sets of parameters configured to be indicated in the grant, the grant being configured to have been obtained from a configuration of the first communication device (101) for uplink transmission.

Embodiment 47

The second communication device (102) according to any of embodiments 45-46, the second communication device (102) being further configured to:
send the grant to the first communication device (101).

Embodiment 48

The second communication device (102) according to embodiment 47, wherein to send the grant comprises at least one of:
a. to send the grant in a message, the message being one of: a downlink control information message, and a message configured to be sent during radio resource control signalling; and
b. to send the grant on a downlink control channel.

Embodiment 49

The second communication device (102) according to any of embodiments 45-48, wherein the grant is configured to be based on a configuration of the first communication device (101) configured to allow the grant to be obtained.

Embodiment 50

The second communication device (102) according to any of embodiments 45-49, wherein the selected second set of parameters is configured to guarantee a certain quality of service.

Embodiment 51

The second communication device (102) according to embodiment 50, wherein the selected second set of parameters is configured to guarantee the certain quality of service when the uplink transmission is to comprise Ultra Reliable and Low Latency, URLLC, traffic.

Embodiment 52

The second communication device (102) of according to any of embodiments 45-51, wherein the uplink transmission is a block of information comprising URLLC traffic and another type of traffic with a different quality of service requirement, and wherein the block of information is one of:
a. configured to be received according to multiplexing the URLLC traffic and the another type of traffic into a single Protocol Data Unit, PDU, and wherein the first communication device (101) is further configured to apply the selected second set of parameters for transmitting the PDU, wherein the selected second set of parameters is configured to guarantee a certain quality of service requirement for URLLC traffic, and
b. configured to be received with the URLLC traffic and the another type of traffic in separate PDUs, wherein the selected second set of parameters comprises different sets of second parameters comprising a first second set of parameters and a second second set of parameters, and wherein the first communication device (101) is further configured to apply the different sets of second parameters to each PDU, wherein the first second set of parameters is configured to guarantee a certain quality of service requirement for URLLC traffic, and the first communication device (101) is further configured to apply the first second set of parameters to the PDU comprising the URLLC traffic.

What is claimed is:

1. A method performed by a first communication device operating in a wireless communications network, the method comprising:
obtaining a grant for an uplink transmission to a second communication device operating in the wireless communications network, the grant comprising a first indication of one or more first sets of parameters for transmission, the parameters for transmission being at least one of a Modulation and Coding Scheme (MCS), a Transmission Time Interval (TTI) bundling indicator and a Transmission Power Control (TPC) command;
selecting a second set of parameters for the uplink transmission based on:
the indicated one or more first sets of parameters, and
one or more quality of service requirements of an information to be transmitted in the uplink transmission; and
initiating sending of the uplink transmission to the second communication device, based on the second set of parameters, the uplink transmission comprising a block of information comprising Ultra-Reliable and Low-Latency Communications (URLLC) traffic and another type of traffic with a different quality of service requirement, and the block of information being configured to be sent by the first communication device by:
multiplexing the URLLC traffic and the another type of traffic into a single Protocol Data Unit (PDU) and applying the second set of parameters for sending the PDU, the second set of parameters guaranteeing a certain quality of service requirement for URLLC traffic.

2. A method performed by a second communication device operating in a wireless communications network, the method comprising:
receiving a second indication of a second set of parameters from a first communication device operating in the wireless communications network, the second set of parameters being for an uplink transmission to the second communication device, the second set of parameters having been selected by the first communication device from one or more first sets of parameters for transmission indicated by a first indication comprised in a grant for the uplink transmission, the parameters for transmission being at least one of a Modulation and Coding Scheme (MCS), a Transmission Time Interval (TTI) bundling indicator and a Transmission Power Control (TPC) command, the second set of parameters having been selected based on:
the indicated one or more first sets of parameters, and
one or more quality of service requirements of an information transmitted in the uplink transmission, and
initiating reception of the uplink transmission from the first communication device, based on the second set of parameters, the uplink transmission comprising a block of information comprising Ultra-Reliable and Low-Latency Communications (URLLC) traffic and another type of traffic with a different quality of service requirement, and the block of information being:
received according to multiplexing the URLLC traffic and the another type of traffic into a single Protocol Data Unit (PDU), and the first communication device being further configured to apply the second set of parameters for transmitting the PDU, the second set of parameters guaranteeing a certain quality of service requirement for URLLC traffic.

3. A first communication device, the first communication device being configured to operate in a wireless communications network, the first communication device comprising:
communication circuitry configured for communicating with a second communication device configured to operate in the wireless communication network; and
processing circuitry operatively associated with the communication circuitry and configured to:
obtain a grant for an uplink transmission to the second communication device, the grant comprising a first indication of one or more first sets of parameters for transmission, the parameters for transmission being at least one of a Modulation and Coding Scheme (MCS), a Transmission Time Interval (TTI) bundling indicator and a Transmission Power Control (TPC) command;
select a second set of parameters for the uplink transmission based on:
the one or more first sets of parameters, and
one or more quality of service requirements of an information to be transmitted in the uplink transmission; and
send the uplink transmission to the second communication device, based on the second set of parameters, the uplink transmission comprising a block of information comprising Ultra-Reliable and Low-Latency Communications (URLLC) traffic and another type of traffic with a different quality of service requirement, and the block of information being configured to be sent by the first communication device by:
multiplexing the URLLC traffic and the another type of traffic into a single Protocol Data Unit (PDU) and applying the second set of parameters for sending the PDU, the second set of parameters guaranteeing a certain quality of service requirement for URLLC traffic.

4. The first communication device according to claim 3, wherein the second set of parameters is one of:
different from any of the one or more first sets of parameters indicated in the grant, the grant being obtained from the second communication device; and
different from any of the one or more first sets of parameters indicated in the grant, the grant being obtained from a configuration of the first communication device for uplink transmission.

5. The first communication device according to claim 3, wherein the processing circuitry is configured to obtain the grant for the uplink transmission by at least one of:
receiving the grant from the second communication device in a message;
receiving the grant from the second communication device on a downlink control channel;
autonomous determination; and
obtaining the grant based on a configuration of the first communication device that allows the grant to be obtained.

6. The first communication device according to claim 5, wherein the message is one of: a downlink control information message, and a message configured to be received during radio resource control signaling.

7. The first communication device according to claim 3, wherein the second set of parameters guarantees a certain quality of service.

8. The first communication device according to claim 7, wherein the second set of parameters guarantees the certain quality of service when the uplink transmission is to comprise Ultra Reliable and Low Latency (URLLC) traffic.

9. The first communication device according to claim 3, wherein the processing circuitry is configured to:
send a second indication of the second set of parameters to the second communication device.

10. The first communication device of claim 3, wherein the grant for the uplink transmission is for a first type of traffic to be transmitted by the first communication device, and wherein the information to be transmitted in the uplink transmission comprises a second type of traffic that preempts the first type of traffic.

11. The first communication device of claim 10, wherein at least one of the one or more first sets of parameters for transmission are determined on first Quality-of-Service (QoS) requirements of the first type of traffic, and wherein the second set of parameters corresponds to second QoS requirements of the second type of traffic, where the second QoS requirements are different than the first QoS requirements.

12. The first communication device of claim 10, wherein the first type of traffic is enhanced Mobile Broadband (eMBB) traffic and the second type of traffic is Ultra-Reliable and Low-Latency Communications (URLLC) traffic.

13. The first communication device of claim 3, wherein the processing circuitry is configured to determine that a second type of traffic becoming available for uplink transmission subsequent to obtaining the grant has priority over a first type of traffic for which the grant was obtained, and wherein the second set of parameters account for differences in Quality-of-Service (QoS) requirements between the first and second types of traffic.

14. A second communication device configured to operate in a wireless communications network, the second communication device comprising:
communication circuitry configured for communicating with a first communication device; and
processing circuitry operatively associated with the communication circuitry and configured to:

receive a second indication of a second set of parameters from the first communication device that is configured to operate in the wireless communications network, the second set of parameters being for an uplink transmission to the second communication device, the second set of parameters having been selected by the first communication device from one or more first sets of parameters for transmission indicated by a first indication comprised in a grant for the uplink transmission, the parameters for transmission being at least one of a Modulation and Coding Scheme (MCS), a Transmission Time Interval (TTI) bundling indicator and a Transmission Power Control (TPC) command, the second set of parameters having been selected based on:
the one or more first sets of parameters, and
one or more quality of service requirements of an information transmitted in the uplink transmission, and
initiate reception of the uplink transmission from the first communication device, based on the second set of parameters, the uplink transmission comprising a block of information comprising Ultra-Reliable and Low-Latency Communications (URLLC) traffic and another type of traffic with a different quality of service requirement, and the block of information being:
received according to multiplexing the URLLC traffic and the another type of traffic into a single Protocol Data Unit (PDU), and the first communication device being further configured to apply the second set of parameters for transmitting the PDU, the second set of parameters guaranteeing a certain quality of service requirement for URLLC traffic.

15. The second communication device according to claim 14, wherein the second set of parameters is one of:
different from any of the one or more first sets of parameters indicated in the grant, the grant having been sent by the second communication device; and
different from any of the one or more first sets of parameters indicated in the grant, the grant having been obtained from a configuration of the first communication device for uplink transmission.

16. The second communication device according to claim 14, wherein the processing circuitry is configured to:
send the grant to the first communication device.

17. The second communication device according to claim 16, wherein the processing circuitry is configured to send the grant by at least one of:
sending the grant in a message, the message being one of: a downlink control information message, and a message configured to be sent during radio resource control signaling; and
sending the grant on a downlink control channel.

18. The second communication device according to claim 14, wherein the grant is based on a configuration of the first communication device that allows the grant to be obtained.

19. The second communication device according to claim 14, wherein the second set of parameters guarantees a certain quality of service.

20. The second communication device according to claim 19, wherein the second set of parameters guarantees the certain quality of service when the uplink transmission is to comprise Ultra Reliable and Low Latency (URLLC) traffic.

* * * * *